3,561,973
PROCESS FOR PREPARING HIGH-ENERGY FISH
PROTEIN CONCENTRATE
Max Rutman, Santiago, Chile, assignor to Instituto de Fomento Pisquero, Santiago, Chile
No Drawing. Filed June 18, 1969, Ser. No. 834,553
Int. Cl. A23j 1/04
U.S. Cl. 99—18                    10 Claims

ABSTRACT OF THE DISCLOSURE

The invention comprises a process for the preparation of a water-soluble, stable, odorless fish protein concentrate containing added fat which is useful as a food supplement. The process comprises cleaning, washing, deboning and pulping fresh fish, mixing the pulp with an aqueous emulsion of an edible fat prepared with an edible surfactant, digesting the fat-fish mixture with a proteolytic enzyme for a short period at a controlled, low temperature, the enzyme Bromelain being preferred, heating the digested mixture to terminate the enzyme activity and pasteurize the mixture, and thereafter homogenizing the mixture and drying it to recover the product.

---

This invention relates to a new, economical process for obtaining a high-energy fish protein concentrate ("FPC") for use as a food supplement, with all the characteristics of an instant product, from fish protein, through a controlled enzymatic digestion.

Several different methods have been devised in order to obtain fish protein concentrates. The chemical methods comprise mainly solvent extraction of undesirable lipids that cause rancidity and odor reversion during storage. Basic physical methods have also been tested. As an example, an aqueous mixture of ground fish has been subjected to a high voltage electrical discharge that made possible the recovery of the protein content. A third group of methods exists which is more promising. These methods have been designated as biological ones, and they comprise the employment of living proteolytic microorganisms or isolated enzymes. The relative activities of available enzymes in hydrolysis of fish protein has been reported in the literature (Hale: Food Technology, vol. 23, p. 107, January 1969).

A primary object of this invention is to provide a new biological method of producing high quality, high-energy FPC that makes use of a proteolytic enzyme.

Autolysis can be considered as an enzymatic method, since it allows the enzymes present in the fish to digest the proteins under specific conditions. Heretofore, the autolytic process has taken too long (as long as 48 hours) because it was desired to completely break down protein and remove oil, and because of this microbial contamination became a serious problem. The use of short reaction times for enzyme digestion of soybean has also been reported in the literature (Fujimaki et al.: Food Technology, vol. 22, p. 889, July 1968).

In fact, one object of this invention is to drastically reduce the reaction time for digestion by employing isolated proteolytic enzymes. In this way, the rapid multiplication of microorganisms cannot take place and the production cost is lower.

A further object of this invention which also has to do with a very short period of enzymatic hydrolysis, is to provide a method for preparing a product without bitter flavor. Enzymatic hydrolysis of vegetable or animal protein develops, in many cases, bitter products or polypeptides. The present invention consists in the proper selection of a proteolytic enzyme, and of a correct short time of reaction, that provides an odorless, and only slightly bitter product.

Careful research has shown that an extended enzymatic digestion of fish proteins (i.e., hours) causes a reduction of their nutritional value and a partial destruction of essential amino acids. Therefore, by digesting the fish meat during a very short period of time, the present invention provides a method by which the nutritious value of the fish meat remains almost intact.

The process of the invention seeks to provide a method by which an instant product is obtained. This means that the product should easily dissolve in water, forming an emulsion (i.e., a colloidal suspension). The product will be referred to herein as water soluble, with this understanding. The fine division of the protein fibers through the enzymatic hydrolysis of the invention produces a final product that can be easily dispersed in water and which will remain stable therein.

Another object of this invention which has to do with the dispersibility of the product is related to other aspects of the method. For dietetic and other reasons noted hereinbelow, it is most desirable to add lipids to the proteins. The method of the present invention introduces the lipids in an early stage of the process in order to facilitate the dispersion of the protein concentrate, to form a lipid-protein complex that can be easily dried by conventional methods (i.e., spray-drying, drum-drying, etc.) and to avoid the production of an excessively hygroscopic powder which would be unstable during storage. Because of the lipids, a gross agglomeration of the protein particles is avoided and stability towards decantation is accomplished. The addition of lipids has a further advantage. It is possible to add antioxidants to a stable fat and when this mixture is homogenized with the meat proteins that carry a small fraction of the original unstable fish fat, total protection against oxidation is obtained. The requirement of an easy dispersibility of the final product determines an additional object. This is the provision of a method in which the reaction temperature of the enzymatic hydrolysis is programmed, and which assures a uniform division of the fibers, and hence, a more stable dispersion. Different changes of the physical structure of the fish meat occur when it is heated. It is known, for instance, that the proteins of cooked fish become insoluble in the tissue fluid or in dilute salt solution. In order to avoid the curdling and coagulation of the minced fish meat, the temperature of the enzymatic reaction is carefully controlled and, as noted above, a more uniform fractionation is accomplished.

Other objects and advantages of the invention will become clearer and apparent after referring to the method described below.

The present method is applicable to any type of lean fish. The fresh fish should be eviscerated and cleaned with heads and entrails removed. The fillets so obtained are passed through a meat separator machine to separate the meat from the scales, skin, and a large percentage of the undesirable lipids. The comminuted fish meat is then washed with water. Washing accomplishes several important features. It removes the blood and most bacteria, and it reduces the concentration of other compounds which can lead to an off-color and off-flavor product (desired color is white and desired flavor is neutral and, specifically, not fishy). Further, washing removes a significant fraction of the total lipids contained in the fish. Such lipids are reactive (i.e., lead to spoilage). After washing, the comminuted fish meat is white, odorless and tasteless. This meat slurry is conveyed through a fish bone separator machine and then it is centrifuged to eliminate part of the water.

The preparation of a fat-water emulsion can be carried out in parallel with the washing step. There are several reasons for adding suitable fat to the mixture. As noted above, it is desirable from a dietetic point of view, as it provides a high-energy component to the final product. However, the fat also has several other functions. The added fat and natural lipids remaining in the fish are mutually soluble, but are insoluble in water. By adding an antioxidant to the added fat the entire fat content is rendered stable. Further, without the fat, it would content is rendered stable. Further, without the fat, it would not be possible to produce a non-hygroscopic material. Lastly, a stable, homogeneous mixture with the fish slurry is produced, for the reasons noted below. Hydrogenated fish oils, vegetable oils and the like are all suitable as the added lipid. In order to incorporate the lipids in the reaction mixture it is necessary to emulsify them in water by conventional methods such as colloid mills, with the addition of edible surfactants. The amount of oil that is desired to emulsify depends on the type of surfactant and on the total lipids percentage one desires in the final powder. In general, a 6 to 10% stable oil-in-water emulsion can be prepared by adding 1 to 5% (based on total lipid weight) of surfactants.

The next step of the process consists in combining the meat slurry with the oil-in-water emulsion. This operation can be done in a colloid mill or in any other machine of equal efficiency which could also mince the fibers. The proportion of volume of emulsion to weight of meat depends, of course, on the percentage of proteins that are contained in the meat and on the percentage of lipids in the emulsion. But one also has to take into consideration the desired percentage of proteins in the final dried powder. In general, if the meat slurry is prepared in the way described above, it will contain 9–15% protein. In essence, the method is flexible and in order to calculate the proportion of emulsion volume to meat weight it is enough to specify the relation in weight of lipids/proteins of the final powder. The present method has been applied to ratios in weight of lipids/proteins of 1/5 to 1/1 in the final dried product. A preferred ratio of lipids/proteins is 1/2. When dissolved in water to form an emulsion, the product looks and tastes like milk, but is much more nutritious.

The combination of the water-fat emulsion with the fish meat slurry has a synergistic beneficial effect. The emulsion per se is not stable over long periods, and will eventually separate. Likewise, the meat-water slurry tends to separate. When the two are mixed, however, the protein of the meat coats the individual fat globules. This prevents both kinds of separation from taking place and produces a stable, homogeneous mixture.

The choice of an operable enzyme for use in the process depends on many factors, not the least of which is cost. Intended end use of the product is also important. Thus, the cost of an enzyme rises with its purity, but the tendency to produce a bitter or off-flavor product decreases with increasing purity of the enzyme. So if flavor is not an important consideration, a less-pure, cheaper enzyme can be employed. Also, some enzymes produce a protein-lipid particle which is more stable (i.e., will not decant) than others. The enzyme Bromelain, derived from pineapple juice, is preferred in the present invention. However, any of the following enzymes can also be used, subject to the foregoing considerations (Ficin and Papain, for example, produce a more bitter product):

Ficin
Papain
Pronase
Panol (EDC)
Trypsin
Pancreatin
Rhozyme PF (Rhom & Haas)
Bact. Proteinase (EDC)
HT Proteolytic (Miles)
Rhozyme P-11 (Rhom & Haas)
Prolase (Wallterstein)
Fungal Protease (Miles)
Prozyme (protease produced by Streptomyces No. 1033)
Takadiastase-SS (Sankyo Co., Japan)
Thermoase (Daiwa Kasei, Japan)
Bioprase (Nagase & Co., Japan)
Protin—A (Bacterial Alkaline Proteinase, Daiwa Kasei)
Sanzume SS (Sankyo Co., Japan)
Colonase-S (Wakamoto, Japan)
Rhozyme 41 (Rhom & Haas)
Rhozyme B-6 (Rhom & Haas)

The homogenized lipids-protein mixture is then subjected to hydrolysis. The enzyme, dissolved in a buffer of pH 6, is poured in the homogenized mixture at room temperature. The amount of enzyme added depends on its proteolytic activity and on the percentage of proteins of the reaction mixture. On the other hand, the reaction time is fixed by organoleptic considerations and by the stability sought for the dispersion. The temperature of the reaction mixture is slowly raised and the system is gently agitated. Typical values for temperatures and reaction time are given in the example below. The buffer can be chosen from a list that complies with the requirements of good additives.

The precise heating cycle and reaction time for a given mixture must be determined by experimentation. This is not difficult and may be conveniently done in laboratory apparatus by varying the heat transfer rate to the mixture. Every enzyme has a characteristic reaction rate which increases with temperature to a maximum and which drops off rapidly thereafter with deactivation of the enzyme. It is desired to heat the mixture at the fastest possible rate without producing coagulation of protein material on the vessel walls. By heating as fast as possible, the reaction time is kept to a minimum, and this has several desirable effects. First, the size and amount of equipment required (and the energy necessary to heat, stir, etc.) are vastly reduced. More important, the multiplication of bacteria in such a short time is minimal, so there is no need to operate at either a low pH or with the addition of antibiotics. Lastly, the tendency to produce a product with flavor and odor is minimized.

Generally, the digestion takes place in the range of 25°–70° C., and reaction time is less than about 15 minutes.

The liquid hydrolyzed product is filtered or screened to remove any gross solid residue and then it is pasteurized at appr. 80° C. for 15 min. and, simultaneously, the enzyme is denatured and inactivated.

The hot liquid product is homogenized (i.e., in a colloid mill) and then dried by any of the conventional methods (spray-drying, drum-drying, etc.). Yield of the process is better than that obtained in known prior art processes.

The following example is given by way of illustration:

EXAMPLE

Fresh samples of "Merliccius gayi gayi" were eviscerated, beheaded and cleaned with water. The resulting fillets were conveyed through a meat separator machine. The comminuted meat without the skin, scales and bones was washed with water and in this way blood and other materials were eliminated. The clean, white, odorless meat pulp was then passed through a fish bones separator machine and centrifuged to eliminate a fraction of the water.

An approximate analysis of this meat pulp gave:

| | Percent |
|---|---|
| Water | 88 |
| Protein | 11 |
| Ash | 0.2 |
| Fat | 0.4 |

Ten parts of hydrogenated fish fat was melted at approximately 65° C., a mixture of antioxidants (BHA, BHT and dodecyl gallate) was added thereto, 0.15 part of sorbitan monostearate was dissolved in the melted fat, the whole mixture was stirred for 15 min. and then poured into 90 parts of hot water that contained 0.35 part of polyoxyethylene (20) sorbitan monostearate. The resulting hot mixture (60° C.) was then homogenized in a blender and left overnight. Next day the stable oil in water emulsion was separated from the cream of excess fat.

Ten parts of Bromelain of low activity was mixed with 100 parts of buffer pH 6.0 (citric acid + sodium citrate, 0.1 m. in water), gently stirred and then centrifuged at approx. 700 g's for 10 min. in order to settle the undissolved particles. The Bromelain solution was kept at 5° C. One hundred parts of meat pulp, 80 parts of emulsion and 20 parts of water were homogenized in a blender at room temperature for 5 min. To the resulting paste, 6 parts of the Bromelain solution was added with slow agitation.

The temperature of the reaction mixture was slowly raised as shown in the table below using slow agitation (the reaction kettle was kept at 57° C.):

| Temperature ° C.: | Time min. |
|---|---|
| 28 | 0 |
| 36 | 2 |
| 44 | 4 |
| 49 | 6 |
| 52 | 8 |
| 54 | 10 |
| 54 | 12 |
| 54 | 14 |

After 14 min., the already liquefied mixture was rapidly screened and heated to about 80° C. using a heat exchanger and high speed agitation. The cooking temperature was maintained for 12 min. which rendered the material substantially sterile and the Bromelain inactive. The hot liquid was homogenized in a high speed blender (5 min.) and then rapidly cooled to about 5° C. (in about 7 min.).

Drying of the material was accomplished in a spray-drier. The product was white in color, stable, nonhygroscopic, odorless and it imparted a very slight bitter taste that could easily be masked. The powder was readily soluble in water and gave an emulsion that did not decant in several days. The final (dry) product had a PER (protein efficiency ratio) of 3.5, casein was 2.6, and the following approximate composition:

| | Percent |
|---|---|
| Protein | 65 |
| Fat | 27 |
| Moisture | 4 |
| Ash | 2 |

Various changes in the details, steps, materials and proportions, which have been herein described and illustrated in order to explain the nature of the invention, may be made by those skilled in the act within the principle and scope of the invention as defined in the appended claims and their equivalents.

What is claimed is:

1. A process for the preparation of a water soluble high-energy fish protein concentrate comprising:
   washing and pulping fresh fish meat;
   blending the pulped fresh fish meat with an aqueous emulsion of an edible, stable, fat in proportions controlled to produce a lipid/protein weight ratio in the final dried product in the range of 1/5 to 1/1;
   digesting the blend thus obtained with a proteolytic enzyme for no more than about fifteen minutes at temperatures no higher than about 70° C. and with agitation, the amount of enzyme added depending on its proteolytic activity and the precent of protein in said blend;
   heating the digested mixture to a temperature sufficient to pasteurize the mixture and terminate enzyme activity; and
   recovering fish protein concentrate from the mixture.

2. The process as claimed in claim 1, wherein said enzyme is dissolved in an aqueous solution buffered to about pH 6.

3. The process as claimed in claim 1, wherein said digestion is carried out with mild heating in the range of 25° to 70° C. for about fifteen minutes.

4. The process as claimed in claim 1, wherein said emulsion is prepared by homogenizing water, fat and a suitable edible surfactant.

5. The process as claimed in claim 4, wherein said surfactant is selected from the group consisting of sorbitan monostearate and polyoxyethylene (20) sorbitan monostearate.

6. The process as claimed in claim 1, and additionally comprising adding a minor proportion of an antioxidant to said emulsion.

7. The process as claimed in claim 4, wherein said digestion step is carried out to heat said mixture as fast as possible without producing coagulants.

8. The process of preparing fish protein concentrate which comprises the steps of:
   (a) eviscerating, beheading and cleaning fresh fish;
   (b) removing skin, scales and large bones;
   (c) washing the fish meat with water;
   (d) removing remaining bones;
   (e) centrifuging the meat slurry to eliminate part of the water;
   (f) blending the meat pulp with a stable fat in water emulsion in a high speed homogenizer that also minces fish fibers in proportions controlled to produce a lipid/protein weight ratio in the final dried product in the range of 1/5 to 1/1;
   (g) digesting the fat-meat mixture using the enzyme Bromelain which is poured dissolved in a buffer system of pH 6 at a temperature below 70° C. and for no more than about fifteen minutes, the amount of enzyme added depending on its proteolytic activity and the percent of protein in said blend;
   (h) pasteurizing and homogenzing the liquified product; and
   (i) drying and recovering the resulting fish protein concentrate.

9. The process as claimed in claim 8, wherein said fat-in-water emulsion is prepared with a suitable edible surfactant and also contains a minor proportion of an antioxidant.

10. The process as claimed in claim 8, wherein said mixture is heated from room temperature to less than 60° C., in step (g) as fast as possible but without producing coagulants.

References Cited

UNITED STATES PATENTS

| 3,000,742 | 9/1961 | Kuster | 99—7 |
| 3,041,174 | 6/1962 | Ehlert | 99—7 |
| 3,113,030 | 12/1963 | Brody | 99—108 |
| 3,170,794 | 2/1965 | Jeffreys et al. | 99—18 |
| 3,256,098 | 6/1966 | Ohtaki | 99—124 |

RAYMOND N. JONES, Primary Examiner

R. B. ANDEWELT, Assistant Examiner